(12) United States Patent
Fitzer et al.

(10) Patent No.: US 12,494,963 B2
(45) Date of Patent: *Dec. 9, 2025

(54) STANDARDIZED FORMAT FOR CONTAINERIZED APPLICATIONS

(71) Applicant: SAP SE, Walldorf (DE)

(72) Inventors: Joachim Fitzer, Schriesheim (DE); Pietro Francesco Menna Ruiz Diaz, Sao Leopoldo (BR); Felipe Musse, Porto Alegre (BR); Simon Seif, Ostringen (DE)

(73) Assignee: SAP SE, Walldorf (DE)

( * ) Notice: Subject to any disclaimer, the term of this patent is extended or adjusted under 35 U.S.C. 154(b) by 117 days.

This patent is subject to a terminal disclaimer.

(21) Appl. No.: 18/604,887

(22) Filed: Mar. 14, 2024

(65) Prior Publication Data
US 2024/0223471 A1 Jul. 4, 2024

Related U.S. Application Data

(63) Continuation of application No. 17/713,635, filed on Apr. 5, 2022, now Pat. No. 11,979,300, which is a
(Continued)

(51) Int. Cl.
*G06F 8/60* (2018.01)
*G06F 9/455* (2018.01)
(Continued)

(52) U.S. Cl.
CPC ............ *H04L 41/0806* (2013.01); *G06F 8/60* (2013.01); *G06F 9/45558* (2013.01);
(Continued)

(58) Field of Classification Search
CPC . H04L 41/5045; H04L 41/5054; H04L 67/34; H04L 67/10; H04L 41/0896;
(Continued)

(56) References Cited

U.S. PATENT DOCUMENTS 9,396,277 B2 7/2016 Lehman et al.
10,013,189 B1 7/2018 Yang et al.
(Continued)

OTHER PUBLICATIONS

"U.S. Appl. No. 16/214,581, Non Final Office Action mailed Apr. 1, 2020", 5 pgs.
(Continued)

*Primary Examiner* — Emmanuel L Moise
(74) *Attorney, Agent, or Firm* — SCHWEGMAN LUNDBERG & WOESSNER, P.A.

(57) ABSTRACT

A file is created in a standardized format that defines a type of a containerized application and includes information for deployment of the containerized application. A single parser of the standardized format is thus enabled to deploy different types of containerized applications. The standardized file format includes an application definition. The application definition includes a service, a port list, a container list, a volume mount list, an access mode list, a resource usage list, or any suitable combination thereof. A client device presents a user interface that allows a user to select a containerized application to execute. An application server parses an application template file for the selected containerized application and, based on the information in the application template file, causes one or more servers (e.g., one or more Kubernetes cluster nodes) to execute the containerized application.

20 Claims, 9 Drawing Sheets

Related U.S. Application Data continuation of application No. 16/216,570, filed on Dec. 11, 2018, now Pat. No. 11,381,476.

(51) Int. Cl.
  *G06F 9/50* (2006.01)
  *G06F 40/205* (2020.01)
  *H04L 41/0806* (2022.01)
  *H04L 41/0897* (2022.01)
  *H04L 41/5041* (2022.01)
  *H04L 41/5054* (2022.01)
  *H04L 67/00* (2022.01)
  *H04L 67/10* (2022.01)

(52) U.S. Cl.
  CPC .......... *G06F 9/5072* (2013.01); *G06F 9/5077* (2013.01); *G06F 40/205* (2020.01); *H04L 41/0897* (2022.05); *H04L 41/5045* (2013.01); *H04L 41/5054* (2013.01); *H04L 67/10* (2013.01); *H04L 67/34* (2013.01); *G06F 2009/45562* (2013.01)

(58) Field of Classification Search
  CPC ..... H04L 41/0806; G06F 40/205; G06F 8/60; G06F 9/5077; G06F 9/45558; G06F 9/5072; G06F 2009/45562
  See application file for complete search history.

(56) References Cited

U.S. PATENT DOCUMENTS

| | | | |
|---|---|---|---|
| 10,594,582 B2 | 3/2020 | Joshi et al. | |
| 10,778,540 B2 | 9/2020 | Fitzer et al. | |
| 10,897,408 B2 | 1/2021 | Fitzer et al. | |
| 11,212,366 B2 | 12/2021 | Fitzer et al. | |
| 11,381,476 B2 | 7/2022 | Fitzer et al. | |
| 11,516,312 B2 | 11/2022 | Fitzer et al. | |
| 2007/0143398 A1 | 6/2007 | Graham | |
| 2011/0125821 A1 | 5/2011 | Roshen | |
| 2014/0130036 A1 | 5/2014 | Gurikar et al. | |
| 2015/0051930 A1 | 2/2015 | Yamaguchi et al. | |
| 2015/0113009 A1 | 4/2015 | Zhou et al. | |
| 2015/0142878 A1 | 5/2015 | Hebert et al. | |
| 2016/0080479 A1* | 3/2016 | Zhang | H04L 67/10 709/217 |
| 2016/0112497 A1 | 4/2016 | Koushik et al. | |
| 2017/0111241 A1 | 4/2017 | Degioanni | |
| 2017/0353444 A1 | 12/2017 | Karangutkar et al. | |
| 2018/0088935 A1* | 3/2018 | Church | G06F 11/3051 |
| 2018/0152534 A1 | 5/2018 | Kristiansson et al. | |
| 2018/0247064 A1 | 8/2018 | Aronovich et al. | |
| 2018/0367528 A1 | 12/2018 | Schwarz et al. | |
| 2019/0065323 A1 | 2/2019 | Dhamdhere et al. | |
| 2019/0102280 A1 | 4/2019 | Caldato et al. | |
| 2019/0138638 A1 | 5/2019 | Pal et al. | |
| 2019/0190771 A1 | 6/2019 | Fang | |
| 2019/0324786 A1 | 10/2019 | Ranjan et al. | |
| 2019/0356661 A1 | 11/2019 | Hecht | |
| 2020/0026587 A1 | 1/2020 | Gupta et al. | |
| 2020/0028848 A1 | 1/2020 | Gupta et al. | |
| 2020/0076685 A1 | 3/2020 | Vaidya et al. | |
| 2020/0104161 A1 | 4/2020 | Kapur et al. | |
| 2020/0186441 A1 | 6/2020 | Fitzer et al. | |
| 2020/0186443 A1 | 6/2020 | Fitzer et al. | |
| 2020/0186616 A1 | 6/2020 | Fitzer et al. | |
| 2020/0195525 A1 | 6/2020 | Fitzer et al. | |
| 2022/0006880 A1 | 1/2022 | Fitzer et al. | |
| 2022/0231926 A1 | 7/2022 | Fitzer et al. | |

OTHER PUBLICATIONS

"U.S. Appl. No. 16/214,581, Notice of Allowance mailed May 12, 2020", 7 pgs.
"U.S. Appl. No. 16/214,581, Response filed Apr. 28, 2020 to Non Final Office Action mailed Apr. 1, 2020", 18 pgs.
"U.S. Appl. No. 16/216,570, Examiner Interview Summary mailed Mar. 26, 2020", 3 pgs.
"U.S. Appl. No. 16/216,570, Examiner Interview Summary mailed Oct. 13, 2020", 3 pgs.
"U.S. Appl. No. 16/216,570, Examiner Interview Summary mailed Nov. 9, 2021", 2 pgs.
"U.S. Appl. No. 16/216,570, Final Office Action mailed Aug. 18, 2020", 23 pgs.
"U.S. Appl. No. 16/216,570, Non Final Office Action mailed Feb. 5, 2020", 19 pgs.
"U.S. Appl. No. 16/216,570, Non Final Office Action mailed Mar. 22, 2021", 23 pgs.
"U.S. Appl. No. 16/216,570, Non Final Office Action mailed Sep. 21, 2021", 25 pgs.
"U.S. Appl. No. 16/216,570, Notice of Allowance mailed Mar. 2, 2022", 14 pgs.
"U.S. Appl. No. 16/216,570, Response filed May 4, 2020 to Non Final Office Action mailed Feb. 5, 2020", 11 pgs.
"U.S. Appl. No. 16/216,570, Response filed May 5, 2021 to Non Final Office Action mailed Mar. 22, 2021", 14 pgs.
"U.S. Appl. No. 16/216,570, Response filed Oct. 14, 2020 to Final Office Action mailed Aug. 18, 2020", 11 pgs.
"U.S. Appl. No. 16/216,570, Response filed Nov. 15, 2021 to Non Final Office Action mailed Sep. 21, 2021", 15 pgs.
"U.S. Appl. No. 16/216,602, Appeal Brief filed May 11, 2021", 25 pgs.
"U.S. Appl. No. 16/216,602, Examiner Interview Summary mailed Oct. 19, 2020", 3 pgs.
"U.S. Appl. No. 16/216,602, Final Office Action mailed Feb. 3, 2021", 21 pgs.
"U.S. Appl. No. 16/216,602, Non Final Office Action mailed Sep. 9, 2020", 21 pgs.
"U.S. Appl. No. 16/216,602, Notice of Allowance mailed Aug. 24, 2021", 6 pgs.
"U.S. Appl. No. 16/216,602, Response filed Oct. 19, 2020 to Non Final Office Action mailed Sep. 9, 2020", 15 pgs.
"U.S. Appl. No. 16/220,802, Corrected Notice of Allowability mailed Sep. 28, 2020", 6 pgs.
"U.S. Appl. No. 16/220,802, Examiner Interview Summary mailed Mar. 24, 2020", 3 pgs.
"U.S. Appl. No. 16/220,802, Examiner Interview Summary mailed Jun. 24, 2020", 4 pgs.
"U.S. Appl. No. 16/220,802, Examiner Interview Summary mailed Sep. 2, 2020", 3 pgs.
"U.S. Appl. No. 16/220,802, Final Office Action mailed Jun. 2, 2020", 19 pgs.
"U.S. Appl. No. 16/220,802, Non Final Office Action mailed Feb. 19, 2020".
"U.S. Appl. No. 16/220,802, Non Final Office Action mailed Aug. 17, 2020", 17 pgs.
"U.S. Appl. No. 16/220,802, Notice of Allowance mailed Sep. 16, 2020", 10 pgs.
"U.S. Appl. No. 16/220,802, Response filed Mar. 30, 2020 to Non Final Office Action mailed Feb. 19, 2020", 11 pgs.
"U.S. Appl. No. 16/220,802, Response filed Jun. 18, 2020 to Final Office Action mailed Jun. 2, 2020", 8 pgs.
"U.S. Appl. No. 16/220,802, Response filed Aug. 27, 2020 to Non Final Office Action mailed Aug. 17, 2020", 10 pgs.
"U.S. Appl. No. 17/476,225, Corrected Notice of Allowability mailed Nov. 8, 2022", 2 pgs.
"U.S. Appl. No. 17/476,225, Non Final Office Action mailed Apr. 14, 2022", 9 pgs.
"U.S. Appl. No. 17/476,225, Notice of Allowance mailed Jul. 12, 2022", 6 pgs.
"U.S. Appl. No. 17/476,225, Response filed Jun. 22, 2022 to Non Final Office Action mailed Apr. 14, 2022", 8 pgs.
"U.S. Appl. No. 17/713,635, Appeal Brief filed Nov. 7, 2023", 23 pgs.
"U.S. Appl. No. 17/713,635, Examiner Interview Summary mailed Apr. 3, 2023", 2 pgs.

(56) References Cited

OTHER PUBLICATIONS

"U.S. Appl. No. 17/713,635, Final Office Action mailed Aug. 29, 2023", 36 pgs.
"U.S. Appl. No. 17/713,635, Non Final Office Action mailed Feb. 10, 2023", 38 pgs.
"U.S. Appl. No. 17/713,635, Notice of Allowance mailed Feb. 14, 2024", 7 pgs.
"U.S. Appl. No. 17/713,635, Response filed May 8, 2023 to Non Final Office Action mailed Feb. 10, 2023", 15 pgs.
"Kubernetes", Wikipedia, [Online]. Retrieved from the Internet: <URL: https://en.wikipedia.org/w/index.php?title=Kubernetes&oldid=872771944>, (Dec. 9, 2018), 11 pgs.

* cited by examiner

STANDARDIZED FORMAT FOR CONTAINERIZED APPLICATIONS

CROSS-REFERENCE TO RELATED APPLICATIONS

This application is a continuation of prior application Ser. No. 17/713,635, filed on Apr. 5, 2022, which is a continuation of prior application Ser. No. 16/216,570, filed on Dec. 11, 2018, which applications are incorporated by reference herein in their entireties.

TECHNICAL FIELD

The subject matter disclosed herein generally relates to containerized applications. Specifically, the present disclosure addresses systems and methods to implement a standardized format for containerized applications based on Kubernetes.

BACKGROUND

Kubernetes is a system for automating deployment, scaling, and management of containerized applications. Application containerization is a virtualization method used by operating systems to deploy and run distributed applications without launching an entire virtual machine for each application. Applications are deployed in Kubernetes by invoking a command-line tool to execute a customized deployment script. Kubernetes does not provide middleware, data-processing frameworks, databases, caches, or cluster storage systems as built-in services.

Containerized applications have advantages over standard applications. When a standard application is installed on a server, libraries required by the application are also installed. Thus, if multiple applications are installed, the libraries on the server are an amalgamation of the libraries required by each of the multiple applications. If one application installs a different version of a library used by another application, the first installed version is overwritten. As a result, an application may use a version of a library that was not tested with the application, which may further result in unexpected behavior.

One solution to this problem is to run each application in a virtual machine that only has the operating system and the application installed. This ensures that different applications will not cause problems for each other. However, virtual machines have substantial overhead associated with them. As a result, to achieve the same performance as with a standard, non-virtual, deployment, additional or higher-performing computing hardware will be required, increasing costs.

Kubernetes provides another solution in the form of containerized applications. Each container comprises an application and its libraries, but the containers are installed and managed with much less overhead than virtual machines.

BRIEF DESCRIPTION OF THE DRAWINGS

Some embodiments are illustrated by way of example and not limitation in the figures of the accompanying drawings.

DETAILED DESCRIPTION

Example methods and systems are directed to standardized formats for containerized applications. A file is created in a standardized format that defines a type of a containerized application and includes information for deployment of the containerized application. A single parser of the standardized format is thus enabled to deploy different types of containerized applications.

The standardized file format includes an application name, an application version, an application programming interface (API) version, an application type, an application definition, or any suitable combination thereof. The application definition includes a service, a port list, a container list, a volume mount list, an access mode list, a resource usage list, or any suitable combination thereof.

A client device presents a user interface that allows a user to select a containerized application to execute. An application server parses an application template file for the selected containerized application and, based on the information in the application template file, causes one or more servers (e.g., one or more Kubernetes cluster nodes) to execute the containerized application.

By comparison with existing methods of deploying containerized applications that use non-standardized file formats, requiring a different parser for each type of containerized application, the methods and systems herein reduce efforts involved with supporting multiple types of containerized applications. When these effects are considered in aggregate, one or more of the methodologies described herein may obviate a need for certain efforts or resources that otherwise would be involved in supporting multiple types of containerized applications. Computing resources used by one or more machines, databases, or networks may similarly be reduced. Examples of such computing resources include processor cycles, network traffic, memory usage, data storage capacity, power consumption, and cooling capacity.

Figure 1:
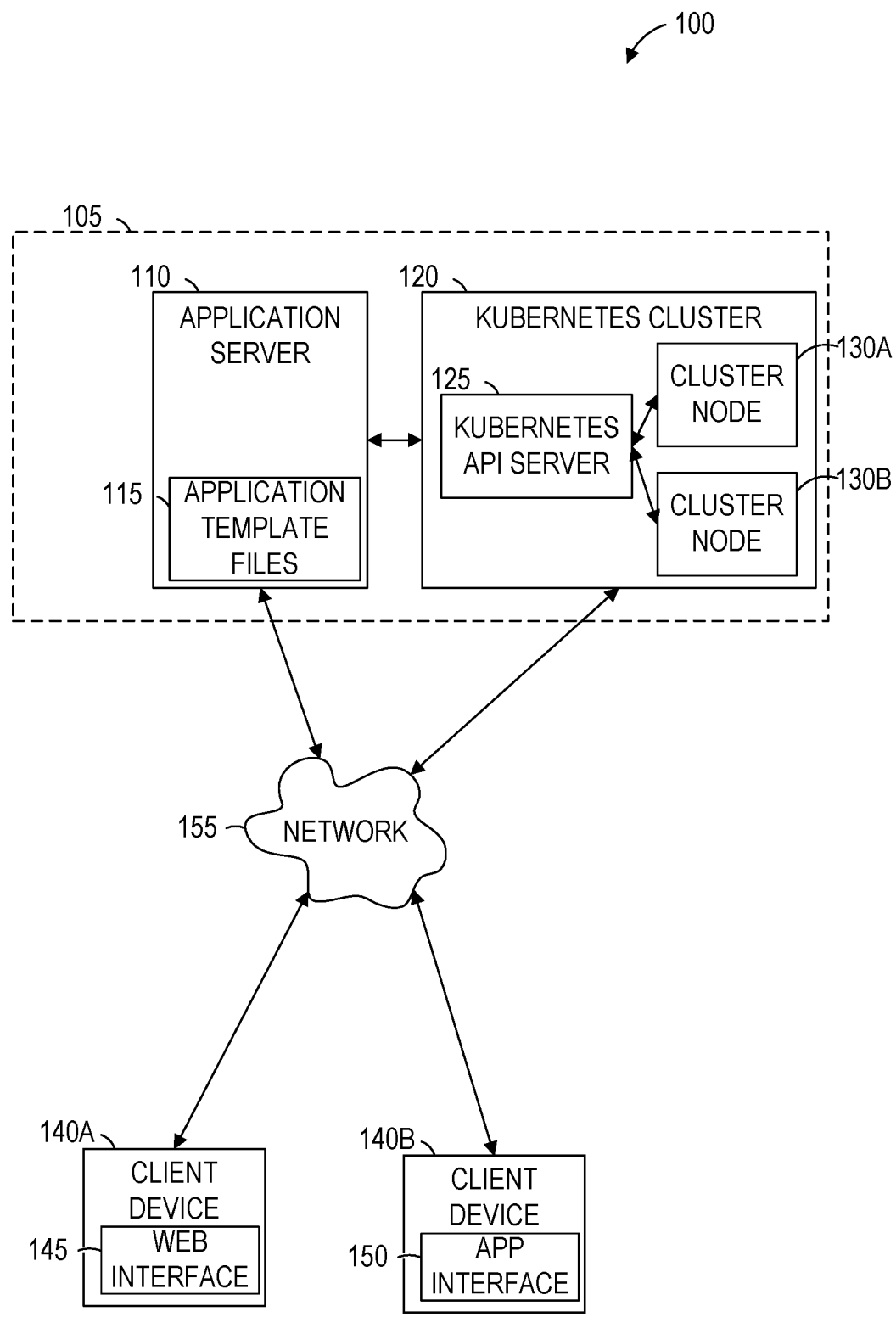
FIG. 1 is a network diagram illustrating a network environment suitable for making use of a standardized format for containerized applications, according to some example embodiments.

FIG. 1 is a network diagram illustrating a network environment 100 suitable for making use of a standardized format for containerized applications, according to some example embodiments. The network environment 100 includes a network-based application 105, client devices 140A and 140B, and a network 155. The network-based application 105 is provided by an application server 110 in communication with a Kubernetes cluster 120. The application server 110 accesses application template files 115 to configure and deploy an application to the Kubernetes cluster 120 via a Kubernetes API server 125 interacting with a set of cluster nodes 130A, 130B. The containerized application is provided to the client devices 140A and 140B via a web interface 145 or an application interface 150, respectively. The application server 110, the Kubernetes API server 125, the cluster nodes 130A and 130B, and the client devices 140A and 140B may each be implemented in a computer system, in whole or in part, as described below with respect to FIG. 9. The cluster nodes 130A and 130B may be referred to collectively as the cluster nodes 130 or generically as a cluster node 130. The client devices 140A and 140B may be referred to collectively as client devices 140 or generically as a client device 140.

The application server 110 provides a user interface for selecting an application to the client devices 140. The Kubernetes API server provides an interface to the Kubernetes cluster 120 and deploys applications to the cluster nodes 130. Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 110, the Kubernetes API server 125, the cluster nodes 130A-130B, and the client devices 140A-140B may be connected by the network 155. The network 155 may be any network that enables communication between or among machines, databases, and devices. Accordingly, the network 155 may be a wired network, a wireless network (e.g., a mobile or cellular network), or any suitable combination thereof. The network 155 may include one or more portions that constitute a private network, a public network (e.g., the Internet), or any suitable combination thereof.

Figure 2:
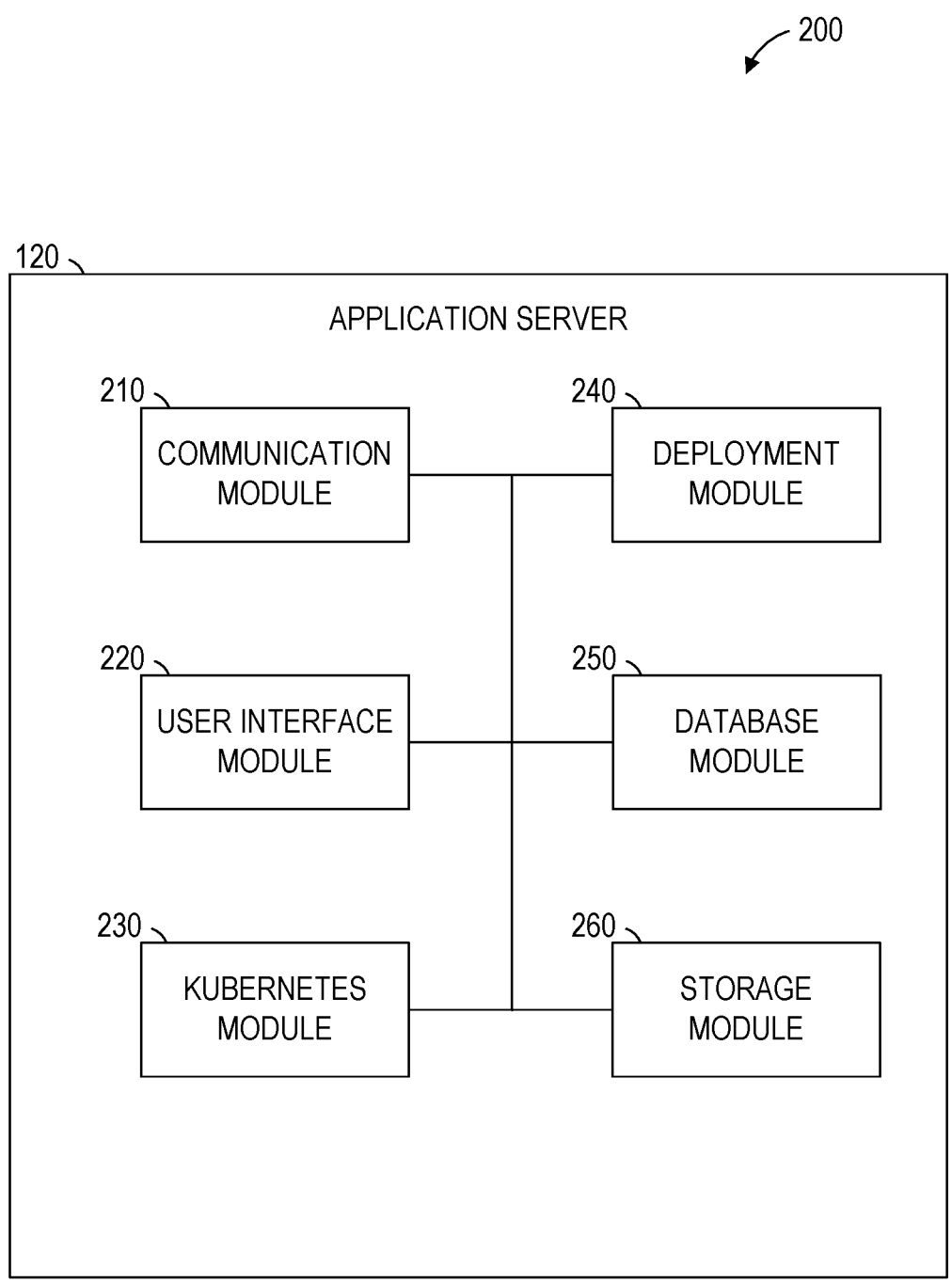
FIG. 2 is a block diagram of an application server, according to some example embodiments, suitable for deploying containerized applications by making used of a standardized format for the containerized applications.

FIG. 2 is a block diagram 200 illustrating components of the application server 120, according to some example embodiments. The application server 120 is shown as including a communication module 210, a user interface module 220, a Kubernetes module 230, a deployment module 240, a database module 250, and a storage module 260, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the application server 120 and transmits data from the application server 120. For example, the communication module 210 may receive, from the client device 140A, data for a selected containerized application. The communication module 210 provides the data to the Kubernetes module 230. The Kubernetes module 230 parses a file for the selected containerized application, the file being in a standardized format. Based on data from the file, the deployment module 240 communicates with the Kubernetes API server 125 to cause one or more of the cluster nodes 130 to execute the containerized application. The cluster nodes 130 executing the containerized application communicate with the client device 140A via the network 155 to provide the selected application. In some example embodiments, data from the file is stored in a database via the database module 250 and the storage module 260. After being stored, the data may be accessed from the database. The communication module 210 may transmit a user interface from the user interface module 220 to the client device 140A that includes data for available containerized applications. The list of available applications may be generated by accessing a manifest file that identifies the available applications; by accessing a directory that contains the files, in the standardized format, for the available applications; by accessing a table in a database that contains entries for the available applications; or any suitable combination thereof. Communications sent and received by the communication module 210 may be intermediated by the network 155.

The user interface module 220 causes presentation of a user interface for the application server 120 on a display associated with the client device 140A or 140B. The user interface allows a user to select an application from a list of applications, to upload an application template file, to delete an application template file, to modify an application template file, or any suitable combination thereof.

Figure 3:
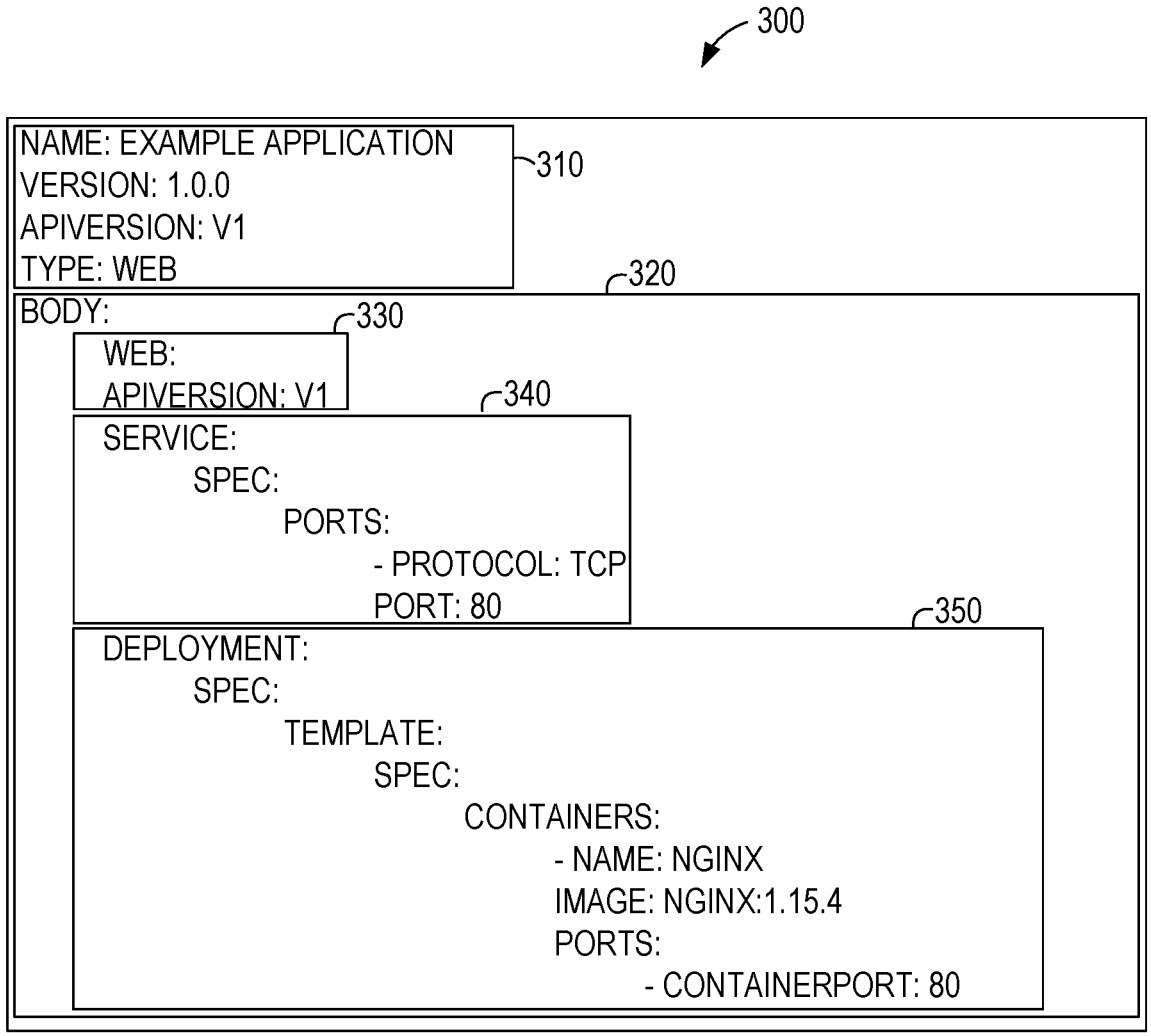
FIG. 3 is an example of a file in a standardized format for a containerized application.

FIG. 3 is an example of a file 300 in a standardized format for a containerized application. The file 300 is a JavaScript object notation (JSON) file and includes a header 310 and a body 320. The body 320 includes a header 330, a service section 340, and a deployment section 350.

The header 310 includes a name of the containerized application, a version of the containerized application, an API version of the containerized application, and a type of the containerized application. The name of the containerized application may be used to identify the application (e.g., in a user interface). The version of the containerized application may be used to distinguish between multiple versions of the containerized application (e.g., by the Kubernetes cluster 120 to ensure that the version being requested is the version available on the Kubernetes cluster 120 or to select between multiple available versions). The API version identifies the version of the application server API to which the file 300 conforms. The application server API may select which parser to use based on the API version.

The header 330 of the body 320 includes an identifier that corresponds to the type in the header 310 and an API version of the body 320. Parsing of the body 320 may be performed based on the API version of the body 320. For example, additional fields may be expected for one API version than for another.

The service section 340 includes a specification section that specifies a list of ports to be used by the containerized application. In the example of FIG. 3, the ports list declares that port 80 is to be used with the transmission control protocol (TCP). Thus, in this example, the port 80 for the application "Example Application" is exposed to users and may be used by users to access the application.

The deployment section 350 includes a specification section that contains a template section with a further specification subsection. In some example embodiments, the structure of the deployment section 350 follows the definition of a Kubernetes deployment manifest file. Additional fields or structures may be present in the deployment/specification section. For example, another Kubernetes object could be defined at this level or a number of replicas could be defined (e.g., by adding "replicas:3" to instruct the server to provide three replicas). The specification subsection includes a list of containers. The inner specification element (e.g., deployment/specification/template/specification) defines a pod. The pod definition may include one or more containers, mount volumes, mount secrets, environment variable definitions, or any suitable combination thereof. The list of containers identifies the name of each container, an image of each container, and a list of ports to be used by the containers. Optionally, the name of the image of a container is followed by a separator character (e.g., ":") and a version number for the image. Thus, in the example of FIG. 3, the version 1.15.4 of the image nginx is to be used.

Figure 4:
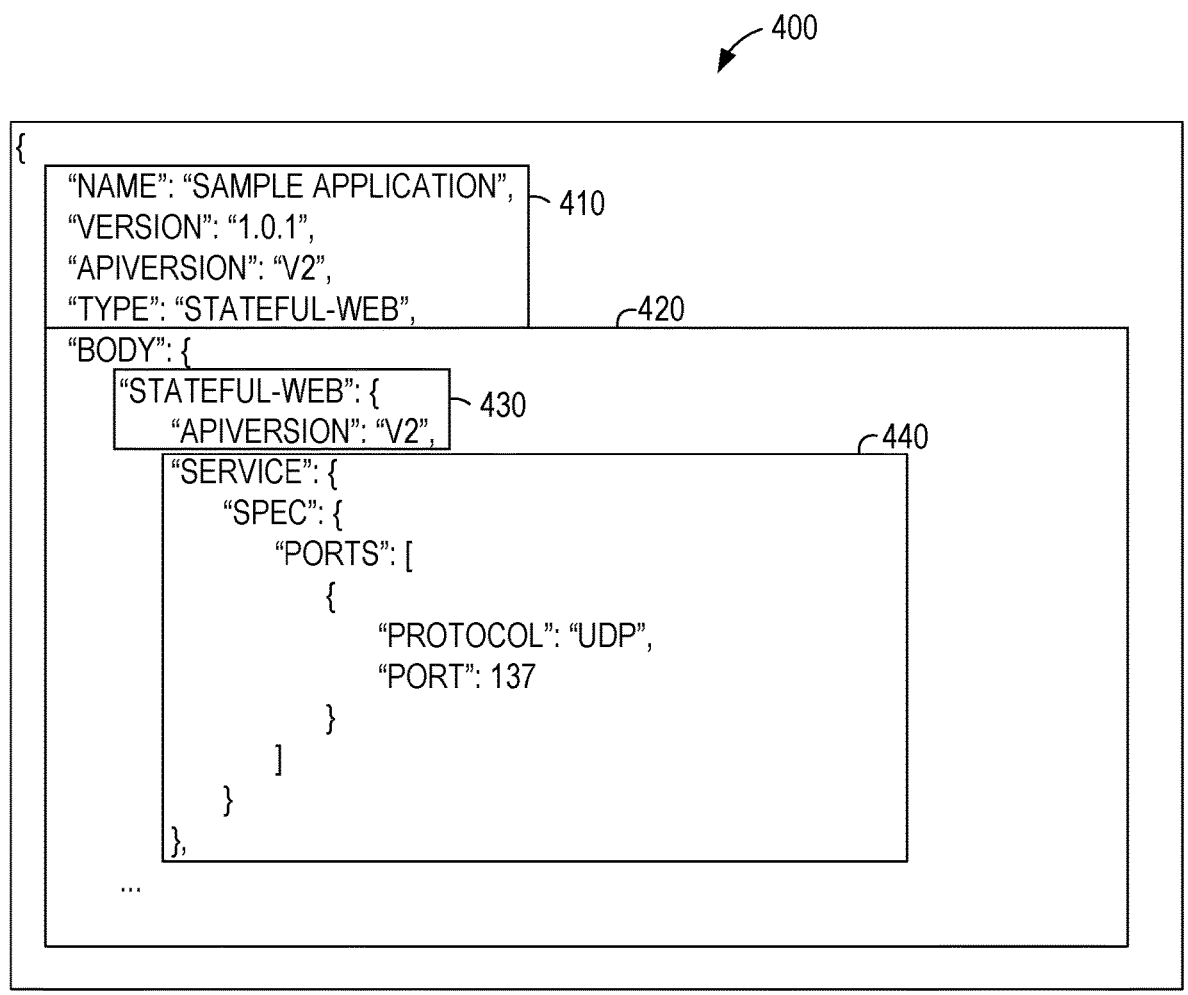
FIGS. 4-6 are an example of a file in a standardized format for a containerized application.
Figure 5:
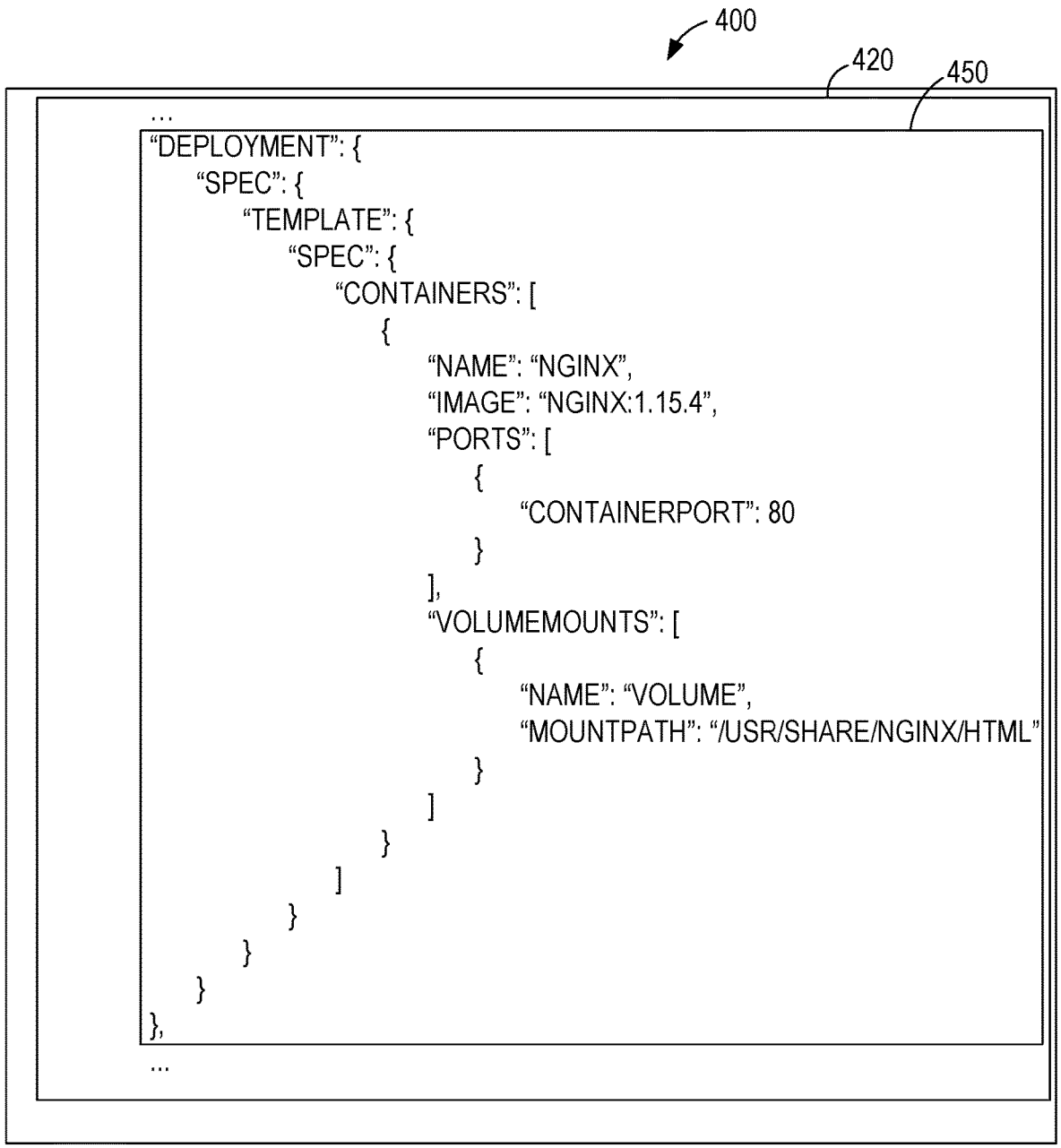
Figure 6:
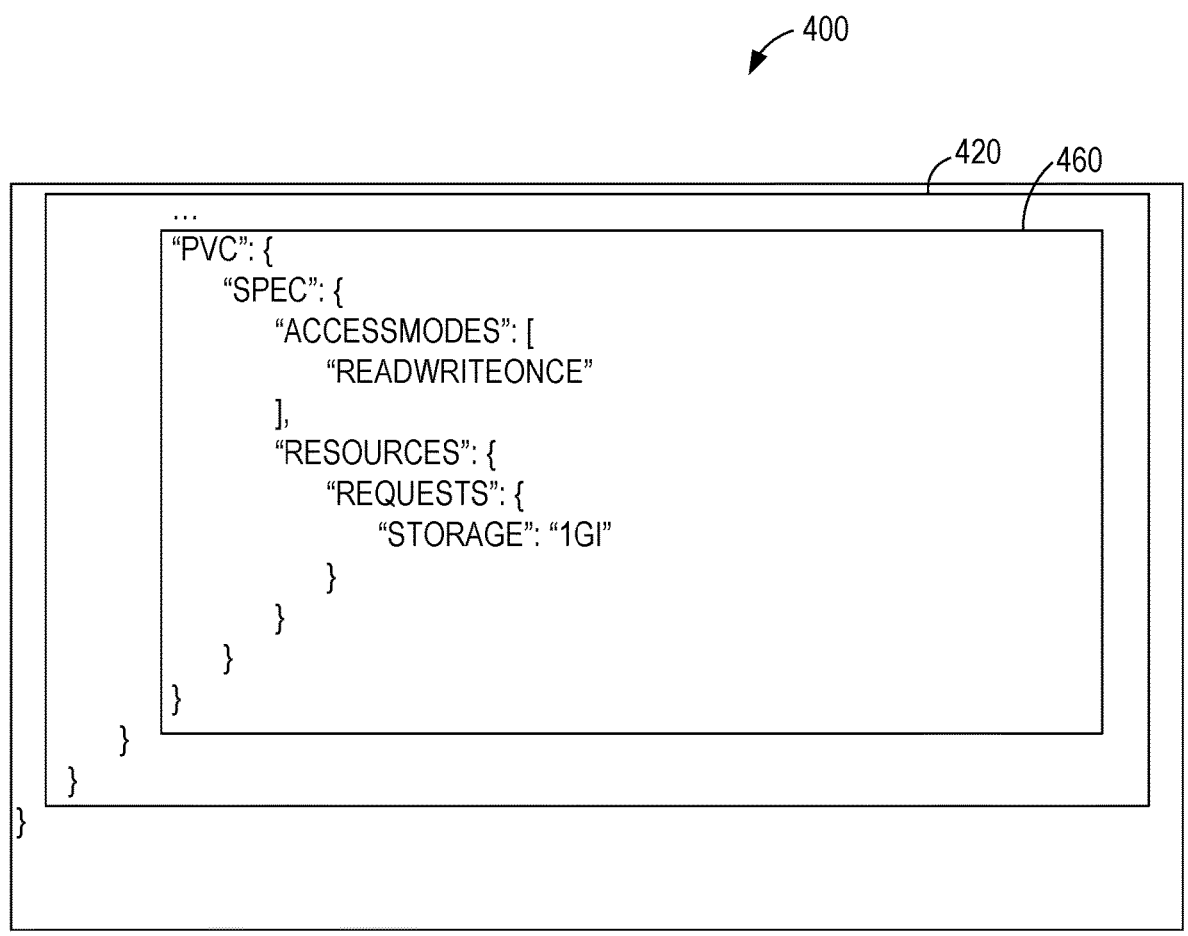

FIGS. 4-6 are an example of a file 400 in another standardized format for a containerized application. The file 400 is a yet another markup language (YAML) file and comprises a header 410 and a body 420. The body 420 comprises a header 430, a service section 440, a deployment section 450, and a persistent volume claim (PVC) section 460.

The header 410 includes a name of the containerized application, a version of the containerized application, an API version of the containerized application, and a type of the containerized application. The name of the containerized application may be used to identify the application (e.g., in a user interface). The version of the containerized application may be used to distinguish between multiple versions of the containerized application (e.g., by the Kubernetes cluster 120 to ensure that the version being requested is the version available on the Kubernetes cluster 120 or to select between multiple available versions). The API version identifies the version of the Kubernetes API to use in communication between the application server 110 and the Kubernetes API server 125 when deploying the containerized application.

The header 430 of the body 420 includes an identifier that corresponds to the type in the header 410 and an API version that corresponds to the API version in the header 410. Detection of a mismatch of these values may result in an error condition.

The service section 440 includes a specification section that specifies a list of ports to be used by the containerized application. In the example of the standardized format file 400, the ports list declares that port 137 is to be used with the user datagram protocol (UDP). Thus, in this example, the port 137 for the application "Sample Application" is exposed to users and may be used by users to access the application.

The deployment section 450 includes a specification section that contains a template section with a further specification subsection. The specification subsection includes a list of containers. The list of containers identifies the name of each container, an image of each container, a list of ports to be used by the containers, and a list of volume mounts for mounting the containers. Optionally, the name of the image of a container is followed by a separator character (e.g., ":") and a version number for the image. Thus, in the example of the standardized format file 400, the version 1.15.4 of the image nginx is to be used.

The list of volume mounts identifies one or more volumes that are made accessible to the containerized application. Thus, in this example, the system path of/usr/share/nginx/html will be made available to the application under the name "volume."

The PVC section 460 includes a specification section with a list of access modes and resources. In this example, the containerized application is permitted to read data and to write data, but not to modify data once written. The containerized application also requests 1 gibibyte (1,073,741,824 bytes) of storage.

The volume mounts of the deployment section 450 and the PVC section 460 work together to define the storage requested by the containerized application and to define the name by which the containerized application will access the storage. In some example embodiments, multiple volumes are mounted using a list in the PVC section 460 and a corresponding list in the deployment section 450.

Figure 7:
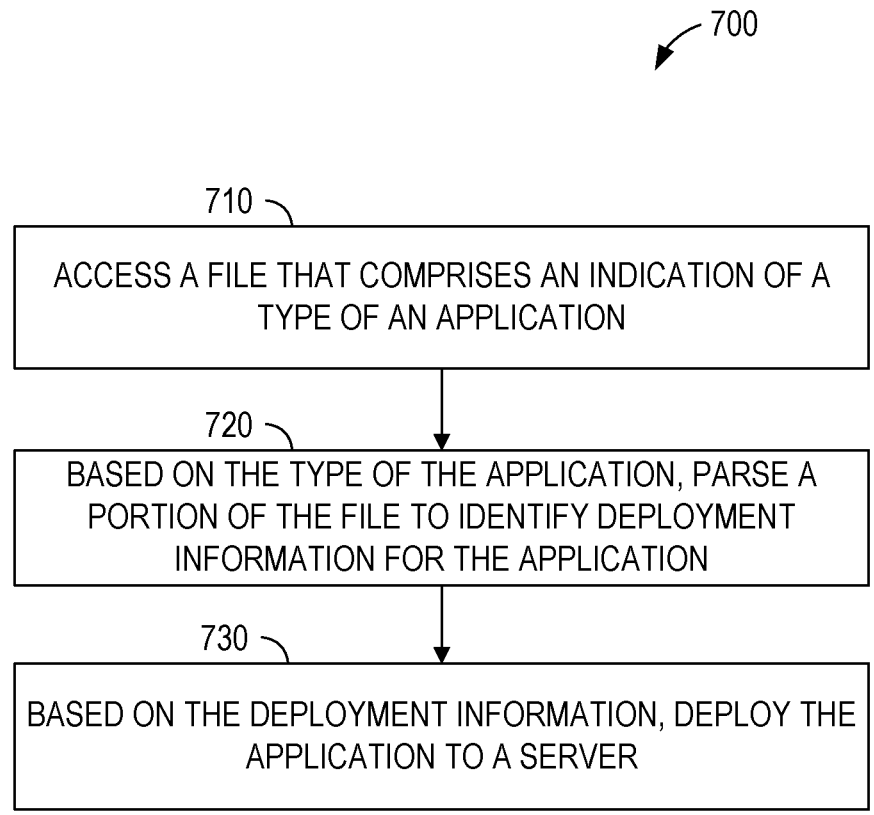
FIG. 7 is a flowchart illustrating operations of a method suitable for deploying a containerized application based on a file in a standardized format, according to some example embodiments.

FIG. 7 is a flowchart illustrating operations of a method 700 suitable for deploying a containerized application based on a file in a standardized format, according to some example embodiments. The method 700 includes operations 710, 720, and 730. By way of example and not limitation, the method 700 is described as being performed by the devices and modules of FIGS. 1-2 and the files of FIGS. 3-6.

In operation 710, the deployment module 240 of the application server 110 accesses a file that comprises an indication of a type of an application. For example, the file 300 may be accessed, wherein the type "web" is indicated in the header 310. As another example, the file 400 may be accessed, wherein the type "stateful-web" is indicated in the header 410.

In operation 720, the deployment module 240, based on the type of the application, parses a portion of the file to identify deployment information for the application. For example, the body 320 may be determined to contain deployment information for the application based on the type "web" of the header 330 matching the type of the application referenced with respect to operation 710. Accordingly, the deployment section 350 may be parsed in operation 720 to identify deployment information for the application such as the containers to be deployed and the ports to be allocated to them. With reference to the file 400, the deployment section 450 further identifies volume mounts for the application.

In operation 730, the deployment module 240, based on the deployment information, deploys the application to a server. For example, the Kubernetes module 230 may communicate with the Kubernetes API server 125 through a representational state transfer (REST) API to indicate the containers to be deployed and resources to be allocated to the containers. The Kubernetes API server 125, in response, deploys the containerized application to one or more of the cluster nodes 130.

The method 700 may be repeated for any number of files. For example, a second file comprising a second indication of a second type of a second application may be accessed in a repeated operation 710 for the second file. To illustrate, the method 700 may be performed for the file 300, with a type of "web" and repeated for the file 400, with a type of "stateful-web."

Figure 8:
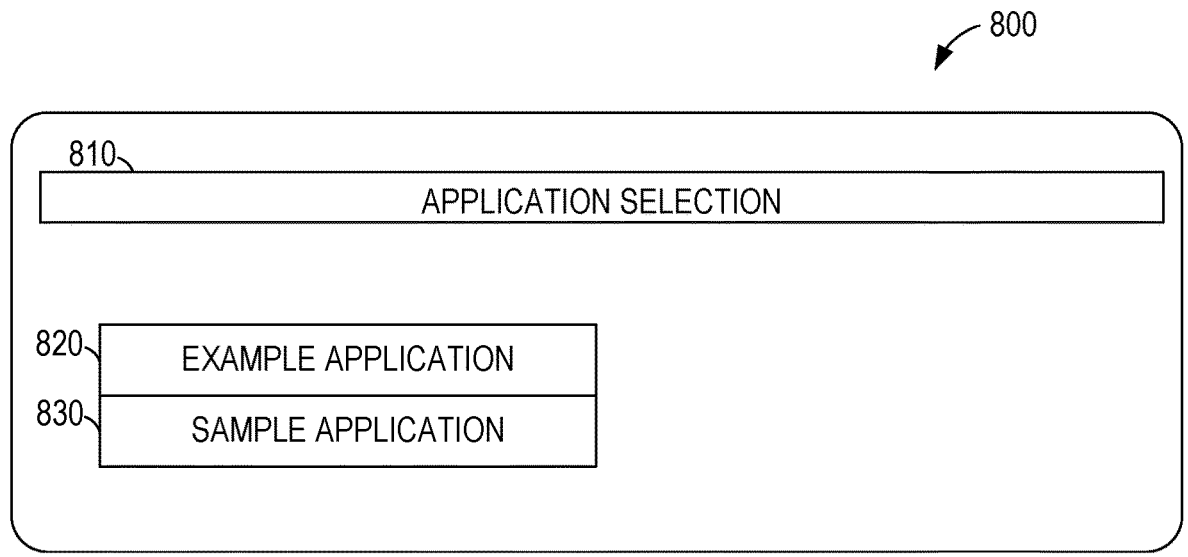
FIG. 8 is a user interface diagram of a user interface suitable for selecting a containerized application, according to some example embodiments.

FIG. 8 is a user interface diagram of a user interface 800 suitable for plausibility-based validation of product costing structures, according to some example embodiments. The user interface 800 includes the title 810 and buttons 820 and 830. The title 810 indicates that the user interface 800 is for application selection. The user interface 800 may be presented on a display of the client device 140A or 140B in response to data received from the application server 110 via the network 155.

Each of the buttons 820 and 830 is operable to select a containerized application to be deployed on the Kubernetes cluster 120. The labels of the buttons 820 and 830 may be derived from the name data stored in files in a standardized format for the containerized applications. For example, the label "Example Application" may have been extracted by the application server 110 from the file 300 and the label "Sample Application" may have been extracted by the application server 110 from the file 400. Operation of a button causes an indication of the selected application to be sent to the application server 110. In response to receiving the selection of the application name, the application server 110 accesses a file corresponding to the selected name and deploys the selected application (e.g., by performing the method 700).

Examples

Example 1. A method comprising:
  causing a user interface to be presented, the user interface comprising a plurality of application names;
  receiving, via the user interface, a selection of an application name of the plurality of application names;
  in response to the receipt of the selection, accessing, by one or more processors, a file that corresponds to the selected application name and comprises an indication of a type of an application;
  identifying a keyword based on the type of the application;
  based on the keyword, parsing a portion of the file to identify deployment information for the application; and
  based on the deployment information, deploying the application to a server.

Example 2. The method of example 1, wherein the deploying of the application to the server comprises interacting with a Kubernetes cluster through a representational state transfer (REST) application programming interface (API).

Example 3. The method of example 1 or example 2, wherein the file is a JavaScript object notation (JSON) file.

Example 4. The method of any of examples 1 to 3, wherein the file is a yet another markup language (YAML) file.

Example 5. The method of any of examples 1 to 4, further comprising:
  accessing a second file that comprises a second indication of a second type of a second application, the second type being different from the type;
  based on the second type of the second application, parsing a second portion of the second file to identify second deployment information for the second application; and
  based on the second deployment information, deploying the second application to the server; wherein
  the parsing of the portion of the file comprises identifying a first keyword based on the type of the application; and
  the parsing of the second portion of the second file comprises identifying a second keyword based on the second type of the second application, the second keyword being different from the first keyword.

Example 6. The method of any of examples 1 to 5, wherein: the deployment information comprises a version of the application; and the deploying of the application to the server is based on the version of the application.

Example 7. The method of any of examples 1 to 6, wherein the file comprises an identification of a port for the application that is exposed to users.

Example 8. The method of any of examples 1 to 7, wherein the application is a containerized application.

Example 9. A system comprising:
  a memory that stores instructions; and
  one or more processors configured by the instructions to perform operations comprising:
    causing a user interface to be presented, the user interface comprising a plurality of application names;
    receiving, via the user interface, a selection of an application name of the plurality of application names;
    in response to the receipt of the selection, accessing a file that corresponds to the selected application name and comprises an indication of a type of an application;
    identifying a keyword based on the type of the application;
    based on the keyword, parsing a portion of the file to identify deployment information for the application; and
    based on the deployment information, deploying the application to a server.

Example 10. The system of example 9, wherein the deploying of the application to the server comprises interacting with a Kubernetes cluster through a representational state transfer (REST) application programming interface (API).

Example 11. The system of example 9 or example 10, wherein the file is a JavaScript object notation (JSON) file.

Example 12. The system of any of examples 9 to 11, wherein the file is a yet another markup language (YAML) file.

Example 13. The system of any of examples 9 to 12, wherein the operations further comprise:
  accessing a second file that comprises a second indication of a second type of a second application, the second type being different from the type;
  based on the second type of the second application, parsing a second portion of the second file to identify second deployment information for the second application; and
  based on the second deployment information, deploying the second application to the server; wherein
  the parsing of the second portion of the second file comprises identifying a second keyword based on the second type of the second application, the second keyword being different from the keyword.

Example 14. The system of any of examples 9 to 13, wherein:
  the deployment information comprises a version of the application; and
  the deploying of the application to the server is based on the version of the application.

Example 15. The system of any of examples 9 to 15, wherein the file comprises an identification of a port for the application that is exposed to users.

Example 16. A non-transitory computer-readable medium that stores instructions that, when executed by one or more processors, cause the one or more processors to perform operations comprising:
  causing a user interface to be presented, the user interface comprising a plurality of application names;

receiving, via the user interface, a selection of an application name of the plurality of application names;

in response to the receipt of the selection, accessing a file that corresponds to the selected application name and comprises an indication of a type of an application;

identifying a keyword based on the type of the application;

based on the keyword, parsing a portion of the file to identify deployment information for the application; and based on the deployment information, deploying the application to a server.

Example 17. The computer-readable medium of example 16, wherein the deploying of the application to the server comprises interacting with a Kubernetes cluster through a representational state transfer (REST) application programming interface (API).

Example 18. The computer-readable medium of example 16 or example 17, wherein the file is a JavaScript object notation (JSON) file.

Example 19. The computer-readable medium of any of examples 16 to 18, wherein the file is a yet another markup language (YAML) file.

Example 20. The computer-readable medium of any of examples 916 to 19, wherein the operations further comprise:

accessing a second file that comprises a second indication of a second type of a second application, the second type being different from the type;

based on the second type of the second application, parsing a second portion of the second file to identify second deployment information for the second application; and based on the second deployment information, deploying the second application to the server; wherein the parsing of the second portion of the second file comprises identifying a second keyword based on the second type of the second application, the second keyword being different from the keyword.

Figure 9:
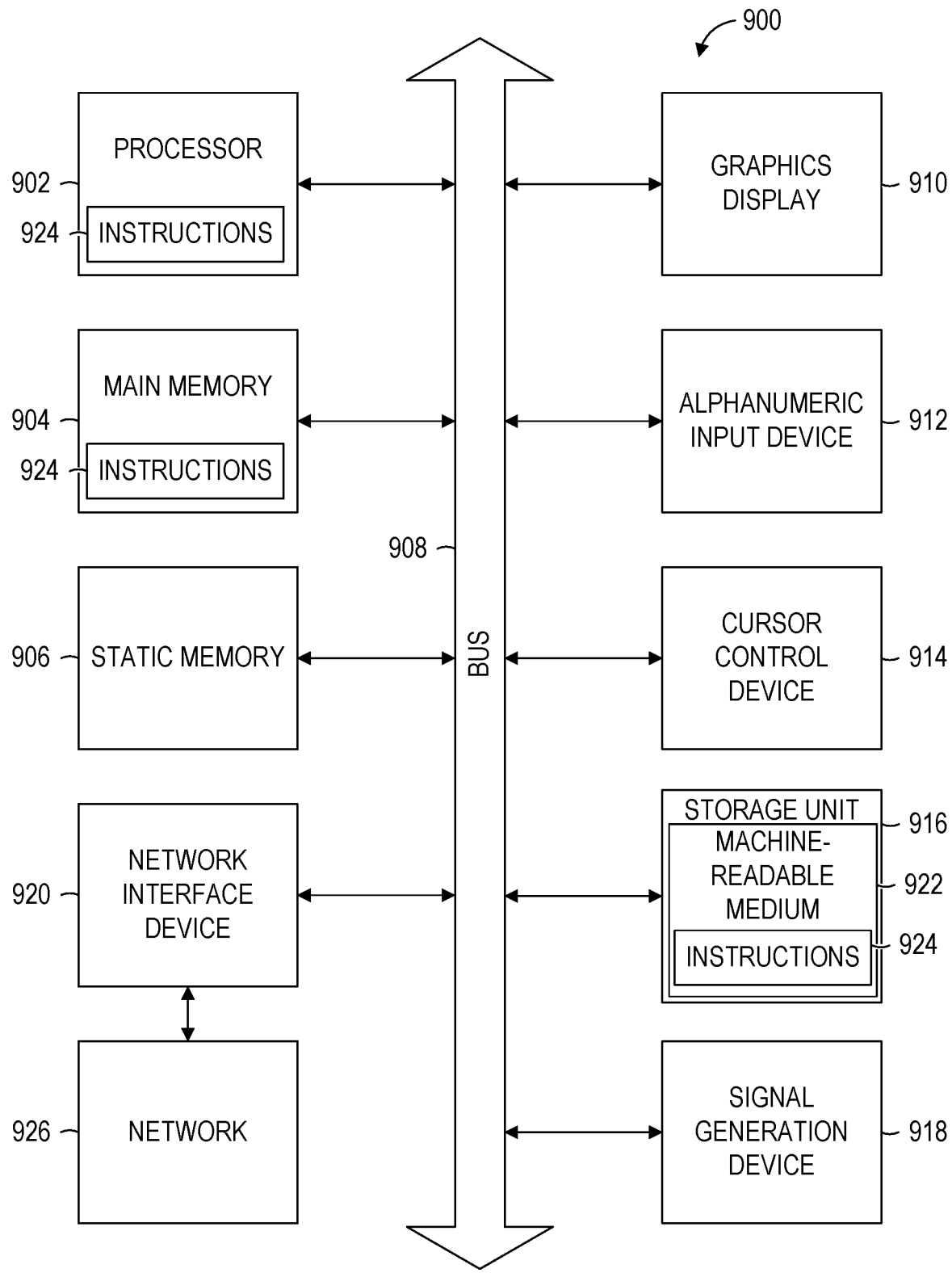
FIG. 9 is a block diagram illustrating components of a machine, according to some example embodiments.

FIG. 9 is a block diagram illustrating components of a machine 900, according to some example embodiments, able to read instructions from a machine-readable medium (e.g., a machine-readable storage medium, a computer-readable storage medium, or any suitable combination thereof) and perform any one or more of the methodologies discussed herein, in whole or in part. Specifically, FIG. 9 shows a diagrammatic representation of the machine 900 in the example form of a computer system within which instructions 924 (e.g., software, a program, an application, an applet, an app, or other executable code) for causing the machine 900 to perform any one or more of the methodologies discussed herein may be executed, in whole or in part. In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a distributed (e.g., peer-to-peer) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924, sequentially or otherwise, that specify actions to be taken by that machine. Further, while only a single machine is illustrated, the term "machine" shall also be taken to include a collection of machines that individually or jointly execute the instructions 924 to perform all or part of any one or more of the methodologies discussed herein.

The machine 900 includes a processor 902 (e.g., a central processing unit (CPU), a graphics processing unit (GPU), a digital signal processor (DSP), an application-specific integrated circuit (ASIC), a radio-frequency integrated circuit (RFIC), or any suitable combination thereof), a main memory 904, and a static memory 906, which are configured to communicate with each other via a bus 908. The machine 900 may further include a graphics display 910 (e.g., a plasma display panel (PDP), a light-emitting diode (LED) display, a liquid crystal display (LCD), a projector, or a cathode ray tube (CRT)). The machine 900 may also include an alphanumeric input device 912 (e.g., a keyboard), a cursor control device 914 (e.g., a mouse, a touchpad, a trackball, a joystick, a motion sensor, or another pointing instrument), a storage unit 916, a signal generation device 918 (e.g., a speaker), and a network interface device 920.

The storage unit 916 includes a machine-readable medium 922 on which are stored the instructions 924 embodying any one or more of the methodologies or functions described herein. The instructions 924 may also reside, completely or at least partially, within the main memory 904, within the processor 902 (e.g., within the processor's cache memory), or both, during execution thereof by the machine 900. Accordingly, the main memory 904 and the processor 902 may be considered as machine-readable media. The instructions 924 may be transmitted or received over a network 926 via the network interface device 920.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 922 is shown, in an example embodiment, to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 900), such that the instructions, when executed by one or more processors of the machine (e.g., the processor 902), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or." unless specifically stated otherwise.

What is claimed is:

1. A method comprising:
accessing, by one or more processors, a file that comprises a header and a body, the header comprising an indication of a type of a containerized application;
identifying, within the body and based on the type of the containerized application, by the one or more processors, a keyword;
based on the keyword, parsing a portion of the body to identify deployment information for the containerized application; and
based on the identified deployment information, deploying the containerized application to a server.

2. The method of claim 1, wherein the file is a JavaScript object notation (JSON) file.

3. The method of claim 1, wherein the file is a yet another markup language (YAML) file.

4. The method of claim 1, wherein:
the type is a first type;
the header is a first header;
the body is a first body;
the keyword is a first keyword;
the containerized application is a first containerized application;
the parsing of the portion of the first body comprises identifying the first keyword based on the first type of the containerized application; and
further comprising:
accessing a second file that comprises a second header and a second body, the second header comprising a second indication of a second type of a second containerized application, the second type being different from the first type;
based on the second type of the second containerized application, parsing a second portion of the second body to identify second deployment information for the second containerized application, the parsing of the second portion of the second body comprising identifying a second keyword based on the second type of the second containerized application, the second keyword being different from the first keyword; and
based on the second deployment information, deploying the second containerized application to the server.

5. The method of claim 1, wherein:
the portion of the body comprises an identification of a version of the containerized application; and
the deploying of the containerized application to the server is based on the version of the containerized application.

6. The method of claim 1, wherein the portion of the body further comprises an identification of a protocol and a port, the protocol being used by the containerized application to communicate using the port.

7. The method of claim 1, wherein the portion of the body further comprises data representing a name of a container for the containerized application.

8. The method of claim 1, wherein the portion of the body further comprises data representing a path for mounting a volume.

9. The method of claim 1, wherein the portion of the body further comprises data representing a quantity of storage requested for the containerized application.

10. A system comprising:
a memory that stores instructions; and
one or more processors configured by the instructions to perform operations comprising:
accessing a file that comprises a header and a body, the header comprising an indication of a type of a containerized application;
identifying, within the body and based on the type of the containerized application, a keyword;
based on the keyword, parsing a portion of the body to identify deployment information for the containerized application; and
based on the identified deployment information, deploying the containerized application to a server.

11. The system of claim 10, wherein the file is a JavaScript object notation (JSON) file.

12. The system of claim 10, wherein the file is a yet another markup language (YAML) file.

13. The system of claim 10, wherein:
the type is a first type;
the header is a first header;
the body is a first body;
the keyword is a first keyword;
the containerized application is a first containerized application;
the parsing of the portion of the first body comprises identifying the first keyword based on the first type of the containerized application; and
the operations further comprise:
accessing a second file that comprises a second header and a second body, the second header comprising a second indication of a second type of a second containerized application, the second type being different from the first type;
based on the second type of the second containerized application, parsing a second portion of the second body to identify second deployment information for the second containerized application, the parsing of the second portion of the second body comprising identifying a second keyword based on the second type of the second containerized application, the second keyword being different from the first keyword; and
based on the second deployment information, deploying the second containerized application to the server.

14. The system of claim 10, wherein:
the portion of the body comprises an identification of a version of the containerized application; and
the deploying of the containerized application to the server is based on the version of the containerized application.

15. A non-transitory computer-readable medium that stores instructions that, when executed by one or more processors, cause the one or more processors to perform operations comprising:
accessing a file that comprises a header and a body, the header comprising an indication of a type of a containerized application;
identifying, within the body and based on the type of the containerized application, a keyword;

based on the keyword, parsing a portion of the body to identify deployment information for the containerized application; and based on the identified deployment information, deploying the containerized application to a server.

16. The computer-readable medium of claim 15, wherein the file is a JavaScript object notation (JSON) file.

17. The computer-readable medium of claim 15, wherein:
the type is a first type;
the header is a first header;
the body is a first body;
the keyword is a first keyword;
the containerized application is a first containerized application;
the parsing of the portion of the first body comprises identifying the first keyword based on the first type of the containerized application; and
the operations further comprise:
    accessing a second file that comprises a second header and a second body, the second header comprising a second indication of a second type of a second containerized application, the second type being different from the first type;
    based on the second type of the second containerized application, parsing a second portion of the second body to identify second deployment information for the second containerized application, the parsing of the second portion of the second body comprising identifying a second keyword based on the second type of the second containerized application, the second keyword being different from the first keyword; and
    based on the second deployment information, deploying the second containerized application to the server.

18. The computer-readable medium of claim 15, wherein:
the portion of the body comprises an identification of a version of the containerized application; and
the deploying of the containerized application to the server is based on the version of the containerized application.

19. The computer-readable medium of claim 15, wherein the portion of the body further comprises an identification of a protocol and a port, the protocol being used by the containerized application to communicate using the port.

20. The computer-readable medium of claim 15, wherein the portion of the body further comprises data representing a name of a container for the containerized application.

* * * * *